(12) United States Patent
Kindaichi et al.

(10) Patent No.: US 9,718,330 B2
(45) Date of Patent: Aug. 1, 2017

(54) VEHICLE SIDE DOOR STRUCTURE

(71) Applicant: TOYOTA JIDOSHA KABUSHIKI KAISHA, Toyota-shi, Aichi-ken (JP)

(72) Inventors: Tetsumasa Kindaichi, Nagoya (JP); Toshimitsu Fujita, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/258,714

(22) Filed: Sep. 7, 2016

(65) Prior Publication Data
US 2017/0072775 A1 Mar. 16, 2017

(30) Foreign Application Priority Data

Sep. 14, 2015 (JP) .................................. 2015-181037
May 19, 2016 (JP) .................................. 2016-100877

(51) Int. Cl.
*B60J 10/00* (2016.01)
*B60J 5/04* (2006.01)
*B60R 21/0136* (2006.01)

(52) U.S. Cl.
CPC ......... *B60J 5/0443* (2013.01); *B60R 21/0136* (2013.01)

(58) Field of Classification Search
CPC .......................... B60J 5/0443; B60R 21/0136
See application file for complete search history.

(56) References Cited

U.S. PATENT DOCUMENTS

| 5,179,256 A * | 1/1993 | Haglund ............... G01L 5/0052 180/282 |
| 5,281,780 A * | 1/1994 | Haland .................. B60J 5/0437 180/274 |
| 7,837,255 B1 | 11/2010 | Okutsu et al. |
| 8,623,696 B2 * | 1/2014 | Cho ..................... H01L 51/0005 257/40 |

(Continued)

FOREIGN PATENT DOCUMENTS

| DE | 4241673 A1 | 6/1994 |
| EP | 0518381 A1 | 12/1992 |

(Continued)

OTHER PUBLICATIONS

Mar. 2, 2017 Search Report Issued in European Patent Office Application No. 16188312.9.

*Primary Examiner* — Lori L Lyjak
(74) *Attorney, Agent, or Firm* — Oliff PLC

(57) ABSTRACT

A vehicle side door structure is provided including: an outer panel that configures a portion at a vehicle width direction outer side of a side door and that extends along a vehicle up-down direction and a vehicle front-rear direction; an inner panel that configures a portion at a vehicle width direction inner side of the side door, that extends along the vehicle up-down direction and the vehicle front-rear direction, and that, together with the outer panel, forms an internal space; an impact beam having both length direction end portions fixed to the inner panel, that is configured in a straight tube shape extending along the vehicle front-rear direction, and that is disposed at an outer panel side in the internal space; and a sensing bracket that is provided at the impact beam and that juts out from the impact beam toward the outer panel.

5 Claims, 10 Drawing Sheets

(56) References Cited

U.S. PATENT DOCUMENTS

2008/0315619 A1   12/2008  Oka
2012/0163906 A1   6/2012   Inoue et al.

FOREIGN PATENT DOCUMENTS

| GB | 2276355 A | 9/1994 |
|---|---|---|
| JP | H0655998 A | 3/1994 |
| JP | 2008-222095 A | 9/2008 |
| JP | 2009-001181 A | 1/2009 |
| JP | 2009-262663 A | 11/2009 |
| JP | 2014-162392 A | 9/2014 |
| WO | 2011/010370 A1 | 1/2011 |

* cited by examiner

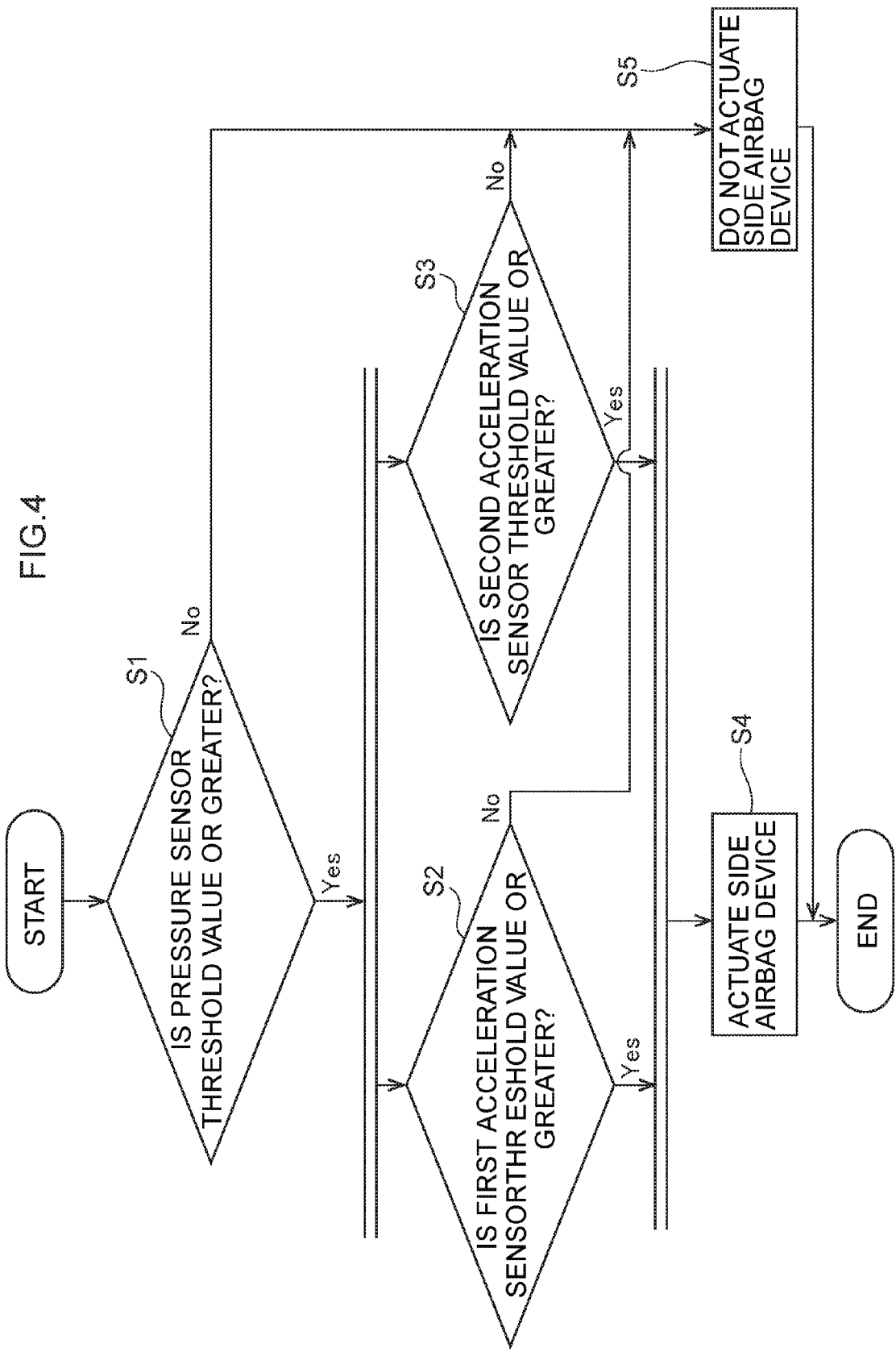

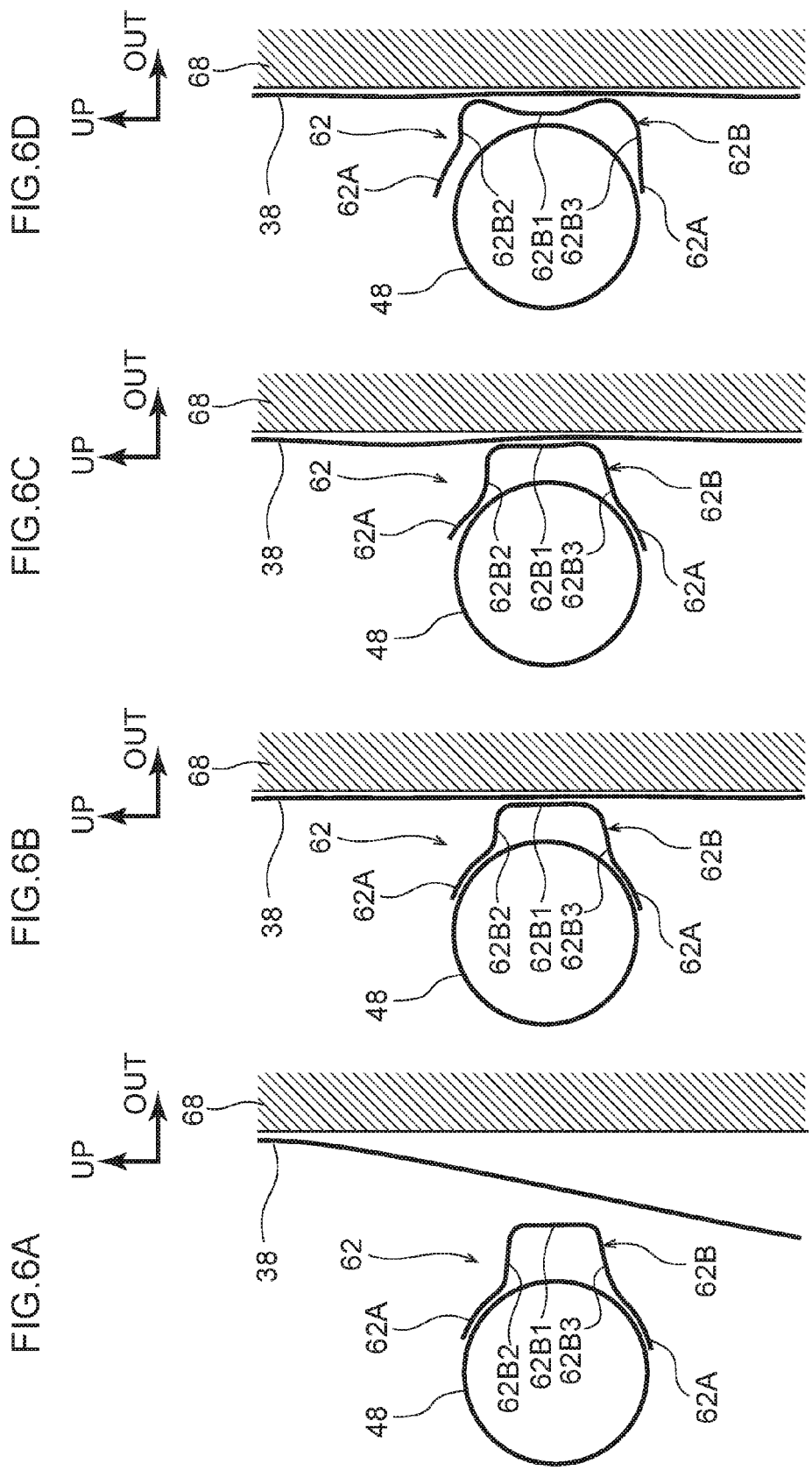

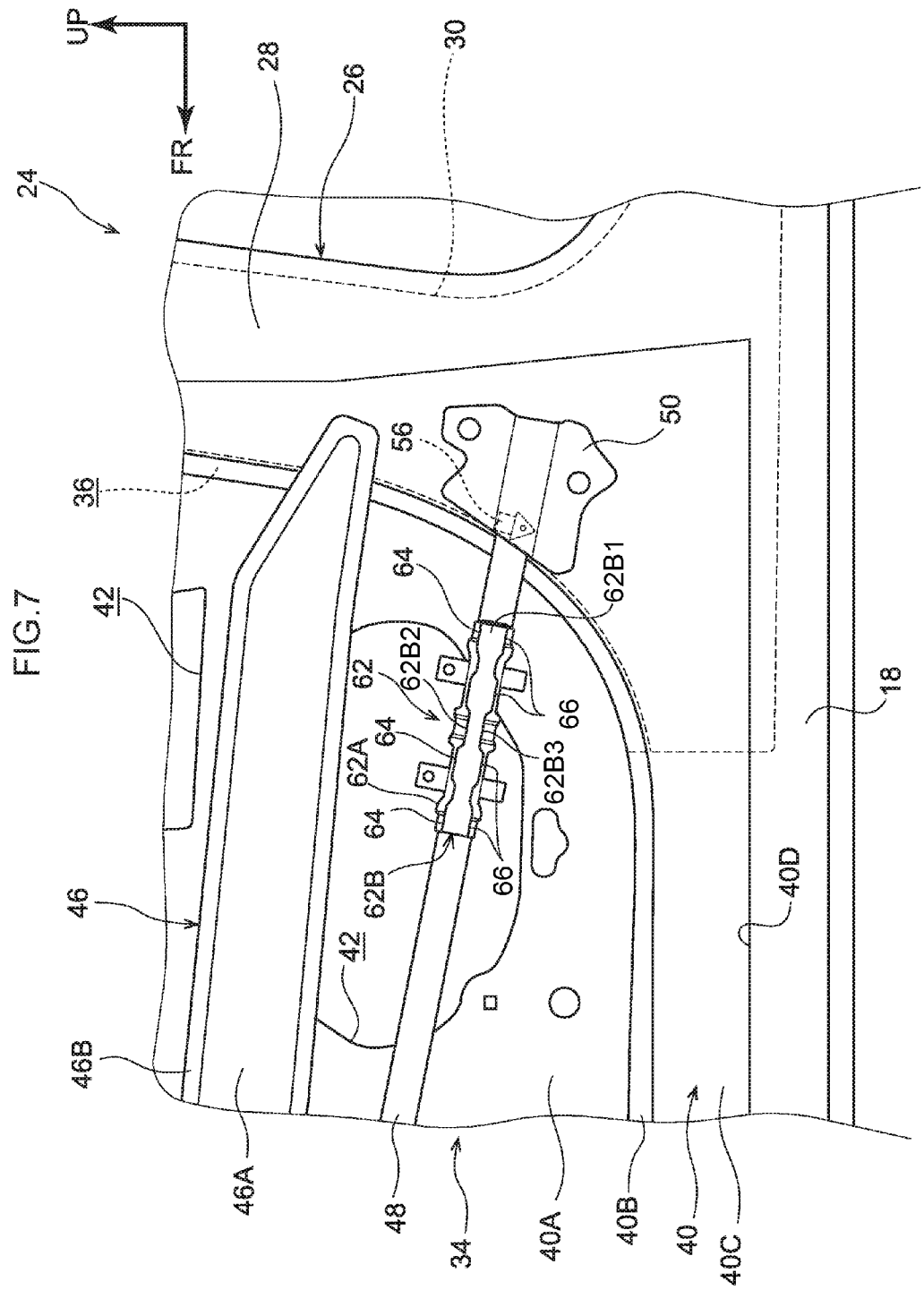

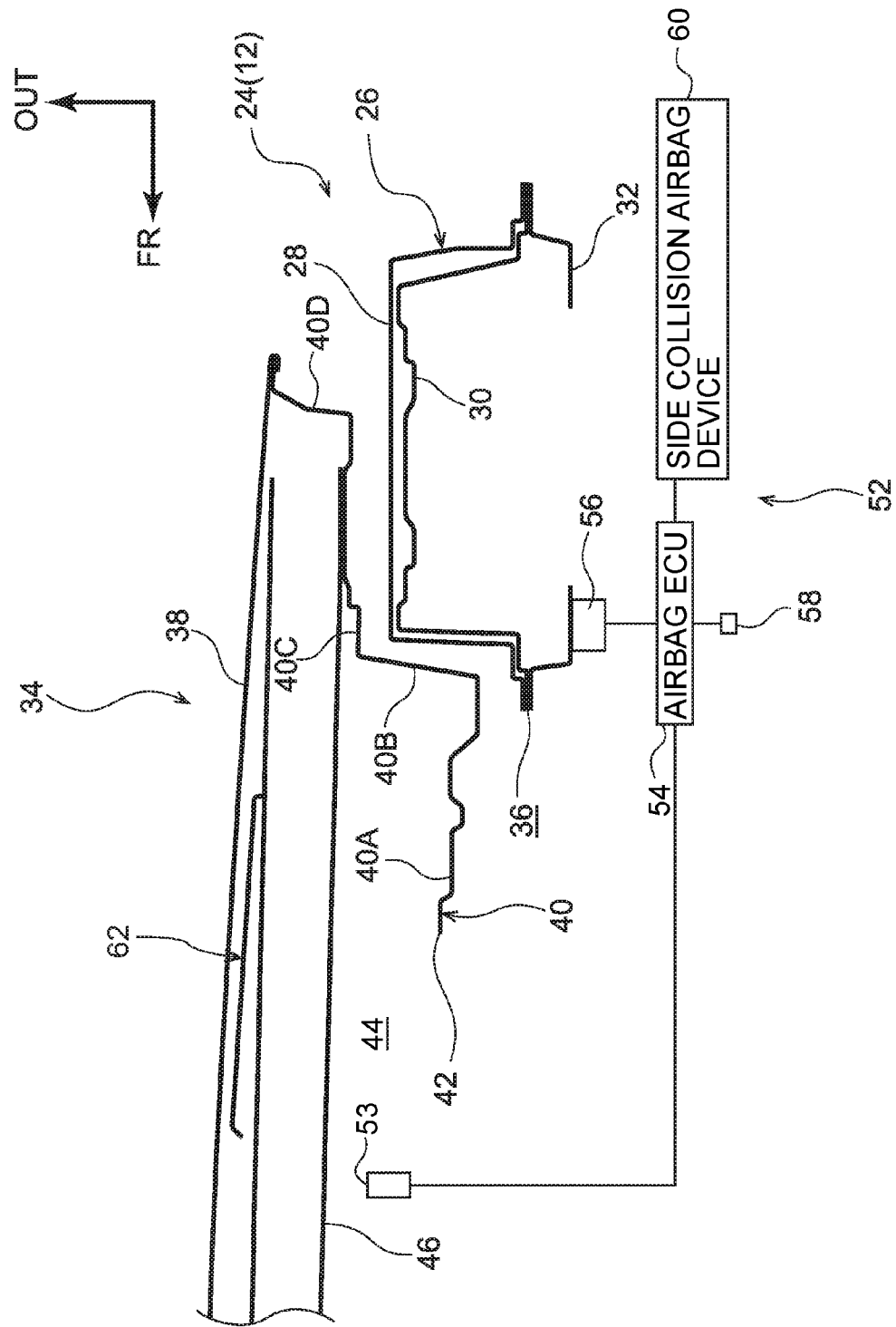

VEHICLE SIDE DOOR STRUCTURE

CROSS-REFERENCE TO RELATED APPLICATION

This application is based on and claims priority under 35 USC 119 from Japanese Patent Application Nos. 2015-181037 filed on Sep. 14, 2015, and 2016-100877 filed on May 19, 2016, the disclosures of which are incorporated by reference herein.

BACKGROUND

Technical Field

The present disclosure relates to a vehicle side door structure.

Related Art

International Publication (WO) No. 2011/010370 describes an invention relating to a vehicle side door structure. In this vehicle side door structure, an acceleration sensor is provided to a side door. The acceleration sensor is configured so as to output a signal according to acceleration in the vehicle width direction, and this signal is output to an airbag ECU. When localized collision load is input to the side door and the signal input to the airbag ECU from the acceleration sensor is a threshold value or greater, the airbag ECU actuates a side airbag device. Thus, an occupant is protected against the side door intruding inner side a vehicle cabin by an inflated and deployed side airbag.

However, when the occupant is protected by the side airbag device, the side airbag needs to be inflated and deployed in a narrow gap between a vehicle width direction outer side side area of the occupant and the side door. Thus, it is preferable to secure as long a usable time as possible in order to deploy the side airbag, and it is therefore desirable that the collision load can be transmitted to the acceleration sensor detecting a collision at an early stage.

Regarding this point, the vehicle side door structure described in WO No. 2011/010370 is configured such that collision load is transmitted to the acceleration sensor at an early stage using a sensing bracket. Specifically, in this vehicle side door structure, a portion at the vehicle width direction outer side of a door main body configures an outer panel, a portion at the vehicle width direction inner side of the door main body configures an inner panel, and an internal space is formed between the outer panel and the inner panel. In this internal space, a straight impact beam is disposed extending along the vehicle front-rear direction at the vehicle width direction inner side of the outer panel, and the sensing bracket is disposed attached to the inner panel at the vehicle width direction inner side of the impact beam. The acceleration sensor is attached at the vehicle cabin inner side of the inner panel. Thus, when localized collision load is input to the outer panel of the side door, the outer panel is pressed and deformed, and collision load is input to the impact beam through the outer panel. A length direction intermediate portion of the impact beam that has been input with collision load bends toward the vehicle width direction inner side, accompanying which the outer panel locally approaches the inner panel side, and the sensing bracket is pressed by the outer panel. Thus, collision load is transmitted to the sensing bracket, and collision load transmitted from the sensing bracket to the inner panel is input to the acceleration sensor attached to the inner panel. Thus, the above related art enables collision load input to the outer panel to be transmitted at an early stage to the acceleration sensor through the sensing bracket.

However, in the case of the above related art, there is a relatively wide space between the outer panel and the impact beam, such that a time lag (namely, free-movement time of the outer panel) arises between the start of deformation of the outer panel and the start of deformation of the impact beam. In particular, the outer panel gently curves toward the vehicle width direction outer side in many vehicle types, such that an even wider gap is formed between the outer panel and the impact beam, this being a factor in the time lag between the start of deformation of the outer panel and the start of deformation of the impact beam. There is accordingly room for improvement with respect to transmitting collision load at an earlier stage to the acceleration sensor.

SUMMARY

In consideration of the above circumstances, an object of the present invention is to obtain a vehicle side door structure capable of transmitting collision load to a cross-section at an even earlier stage when localized collision load is input to a side door.

A vehicle side door structure according to a first aspect includes: an outer panel that configures a portion at a vehicle width direction outer side of a side door and that extends along a vehicle up-down direction and a vehicle front-rear direction; an inner panel that configures a portion at a vehicle width direction inner side of the side door, that extends along the vehicle up-down direction and the vehicle front-rear direction, and that, together with the outer panel, forms an internal space; an impact beam having both length direction end portions fixed to the inner panel, that is configured in a straight tube shape extending along the vehicle front-rear direction, and that is disposed at an outer panel side in the internal space; and a sensing bracket that is provided at the impact beam and that juts out from the impact beam toward the outer panel.

In the first aspect, the portion at the vehicle width direction outer side of the side door is configured by the outer panel extending along the vehicle up-down direction and vehicle front-rear direction, and the portion at the vehicle width direction inner side of the side door is configured by the inner panel extending along the vehicle up-down direction and vehicle front-rear direction. The internal space is formed between the outer panel and the inner panel, and the impact beam is disposed at the outer panel side in the internal space. The impact beam is configured in a straight tube shape extending along the vehicle front-rear direction and has its length direction end portions fixed to the inner panel. Thus, when localized collision load is input to the outer panel of the side door, the outer panel is pressed and deformed, and collision load is input to the impact beam through the outer panel. Collision load that has been input to the impact beam is transmitted to the inner panel from both length direction end portions of the impact beam.

However, when there is a gap between the outer panel and the impact beam, a time lag arises between the start of deformation of the outer panel and the start of deformation of the impact beam, and it is conceivable that there is a delay in the transmission of collision load to the inner panel. In cases in which an acceleration sensor that detects side-on collisions (hereafter referred to as "side collisions") is disposed on the inner panel, or on a configuration member of the vehicle body to which load is transmitted from the inner panel, collision load is preferably transmitted at an earlier stage to the inner panel.

Note that in the present aspect, the impact beam is provided with the sensing bracket that juts out from the impact beam toward the outer panel. Thus, when localized collision load is input to the outer panel, collision load can be transmitted from the outer panel to the impact beam, in a state in which the deformation amount of the outer panel is smaller by the amount at which the sensing bracket juts out. This enables the time taken to transmit load from the outer panel to the inner panel to be shorter than in cases in which the impact beam is not provided with the sensing bracket jutting out from the impact beam toward the outer panel.

A vehicle side door structure according to a second aspect is the vehicle side door structure according to the first aspect, wherein the sensing bracket is disposed, in a vehicle side-on view, further toward a vehicle rear side and a vehicle lower side than a center portion of the outer panel.

In the second aspect, the sensing bracket is disposed further toward the vehicle rear side than the center portion of the outer panel in a vehicle side-on view. Thus, in cases in which localized collision load has been input further toward the vehicle rear side than the center portion of the outer panel in a vehicle side-on view, collision load can be transmitted at an early stage from the outer panel to the impact beam in a state in which the deformation amount of a portion at the vehicle rear side of the outer panel is small.

In cases in which an occupant has a small build, a distance between the outer panel of the side door and the occupant is secured, and it is relatively easy to secure enough usable time to deploy a side collision airbag. However, in cases in which the occupant has a large build, it is difficult to secure a distance between the outer panel of the side door and the occupant, and it is conceivably difficult to secure enough usable time to deploy the side collision airbag. The seated position of occupants with a large build is often positioned further toward the vehicle rear side than the seated position of occupants with a small build.

Note that in the present aspect, as described above, in cases in which localized collision load has been input further toward the vehicle rear side than the center portion of the outer panel in a vehicle side-on view, collision load is more readily transmitted from the outer panel to the impact beam. Thus, even in cases in which an occupant with a large build is onboard the vehicle, enough usable time to deploy the side collision airbag can be secured.

In cases in which an acceleration sensor is disposed on a center pillar that partitions a door opening section that opens and closes the side door, the acceleration sensor detects collision load transmitted from the sensing bracket to the center pillar through the inner panel. Regarding the deformation amount of the center pillar in the vehicle width direction in cases in which collision load has been input to the center pillar, a portion at the vehicle upper side of the center pillar is more readily influenced by the collision load, while a base portion of the center pillar is less readily influenced by the collision load. Namely, in the present aspect, providing the sensing bracket in the above-described position (further toward the vehicle rear side and vehicle lower side than the center portion of the outer panel in a vehicle side-on view) enables the transmission efficiency of collision load from the outer panel of the side door to the acceleration sensor to be secured, even when the acceleration sensor is disposed on (the base side of) the center pillar.

A vehicle side door structure according to a third aspect is the vehicle side door structure according to the second aspect, wherein a vehicle front-rear direction center portion of the outer panel curves so as to bulge toward the vehicle width direction outer side, and a jutting out amount of the sensing bracket from the impact beam toward the outer panel increases on progression toward the vehicle front-rear direction center portion of the outer panel.

In the third aspect, the vehicle front-rear direction center portion of the outer panel of the side door curves so as to bulge toward the vehicle width direction outer side, and the outer panel forms a curved styling face of the side door. The jutting out amount of the sensing bracket from the impact beam toward the outer panel increases on progression toward the vehicle front-rear direction center portion of the outer panel. This enables the jutting out amount of the sensing bracket to be made to correspond to the shape of the outer panel.

A vehicle side door structure according to a fourth aspect is the vehicle side door structure according to any one of the first to the third aspect, wherein the sensing bracket includes a side wall portion that faces the outer panel and extends along the length direction of the impact beam, an upper wall portion that extends out from a peripheral edge at a vehicle upper side of the side wall portion toward the vehicle width direction inner side, and a lower wall portion that extends out from a peripheral edge at a vehicle lower side of the side wall portion toward the vehicle width direction inner side. An upper side bead portion is formed at the upper wall portion so as to protrude out toward the vehicle upper side and run along an upper edge of the side wall portion, and a lower side bead portion is formed at the lower wall portion so as to protrude out toward the vehicle lower side and run along a lower edge of the side wall portion.

In the fourth aspect, the sensing bracket includes the side wall portion that faces the outer panel and extends along the length direction of the impact beam, the upper wall portion that extends out from the peripheral edge at the vehicle upper side of the side wall portion toward the vehicle width direction inner side, and the lower wall portion that extends out from the peripheral edge at the vehicle lower side of the side wall portion toward the vehicle width direction inner side. Namely, the sensing bracket includes the side wall portion, the upper wall portion, and the lower wall portion, is configured in a U shape open toward the vehicle width direction inner side in cross-section viewed from the vehicle front-rear direction, and extends along the length direction of the impact beam. This enables the rigidity of the sensing bracket with respect to collision load input to the side door to be secured.

Note that in the present aspect, the upper side bead portion that protrudes out toward the vehicle upper side and that runs along the upper edge of the side wall portion is formed at the upper wall portion of the sensing bracket, and the lower side bead portion that protrudes out toward the vehicle lower side and that runs along the lower edge of the side wall portion is formed at the lower wall portion of the sensing bracket. Thus, the sensing bracket is reinforced by the upper side bead portion and the lower side bead portion. This enables cross-sectional collapse of the sensing bracket (in cross-section viewed from the vehicle front-rear direction) when the sensing bracket has borne collision load to be suppressed.

As explained above, the vehicle side door structure according to the first aspect has an excellent advantageous effect of enabling collision load to be transmitted at an earlier stage to the acceleration sensor when localized collision load is input to the side door.

The vehicle side door structure according to the second aspect has excellent advantageous effects of enabling the side collision airbag to be stably deployed regardless of whether the occupant has a small build or a large build, and of enabling collision load to be transmitted at an early stage to the acceleration sensor disposed on the center pillar.

The vehicle side door structure according to the third aspect has an excellent advantageous effect of both enabling collision load to be transmitted at an earlier stage to the acceleration sensor and enabling styling of the side door to be secured.

The vehicle side door structure according to the fourth aspect has an excellent advantageous effect of enabling the transmission efficiency of load from the outer panel to the impact beam to be improved.

BRIEF DESCRIPTION OF THE DRAWINGS

Exemplary embodiments of the present disclosure will be described in detail based on the following figures, wherein:

FIG. 4 is a flowchart illustrating an example of processing performed by an airbag ECU configuring an occupant protection device according to the present exemplary embodiment;

FIG. 6A is a cross-section illustrating a deformed state of a sensing bracket and an impact beam directly after localized collision load has been input to a side door applied with a vehicle side door structure according to the present exemplary embodiment, as viewed from the vehicle front side;

FIG. 6B is a cross-section illustrating the next state of the sensing bracket and the impact beam after FIG. 6A, when localized collision load has been input to the side door applied with the vehicle side door structure according to the present exemplary embodiment, as viewed from the vehicle front side;

FIG. 6C is a cross-section illustrating the next state of the sensing bracket and the impact beam after FIG. 6B, when localized collision load has been input to the side door applied with the vehicle side door structure according to the present exemplary embodiment, as viewed from the vehicle front side;

FIG. 6D is a cross-section illustrating the next state of the sensing bracket and the impact beam after FIG. 6C, when localized collision load has been input to the side door applied with the vehicle side door structure according to the present exemplary embodiment, as viewed from the vehicle front side;

FIG. 7 is a side-on view illustrating configuration of relevant portions of a side door applied with the vehicle side door structure according to the present exemplary embodiment in a state in which an outer panel has been removed, as viewed from the vehicle width direction outer side;

FIG. 8 is an enlarged cross-section (an enlarged cross-section illustrating a state sectioned along line 8-8 in FIG. 9) illustrating a relationship between a side door applied with a vehicle side door structure according to the present exemplary embodiment, and a center pillar and its surrounding structure, as viewed from the vehicle lower side;

DETAILED DESCRIPTION

Explanation follows regarding an example of an exemplary embodiment of a vehicle side door structure according to the present disclosure, with reference to FIGS. 1 to 10. Note that in each of the drawings as appropriate, the arrow FR indicates the vehicle front side, the arrow UP indicates the vehicle upper side, and the arrow OUT indicates the vehicle width direction outer side.

Figure 10:
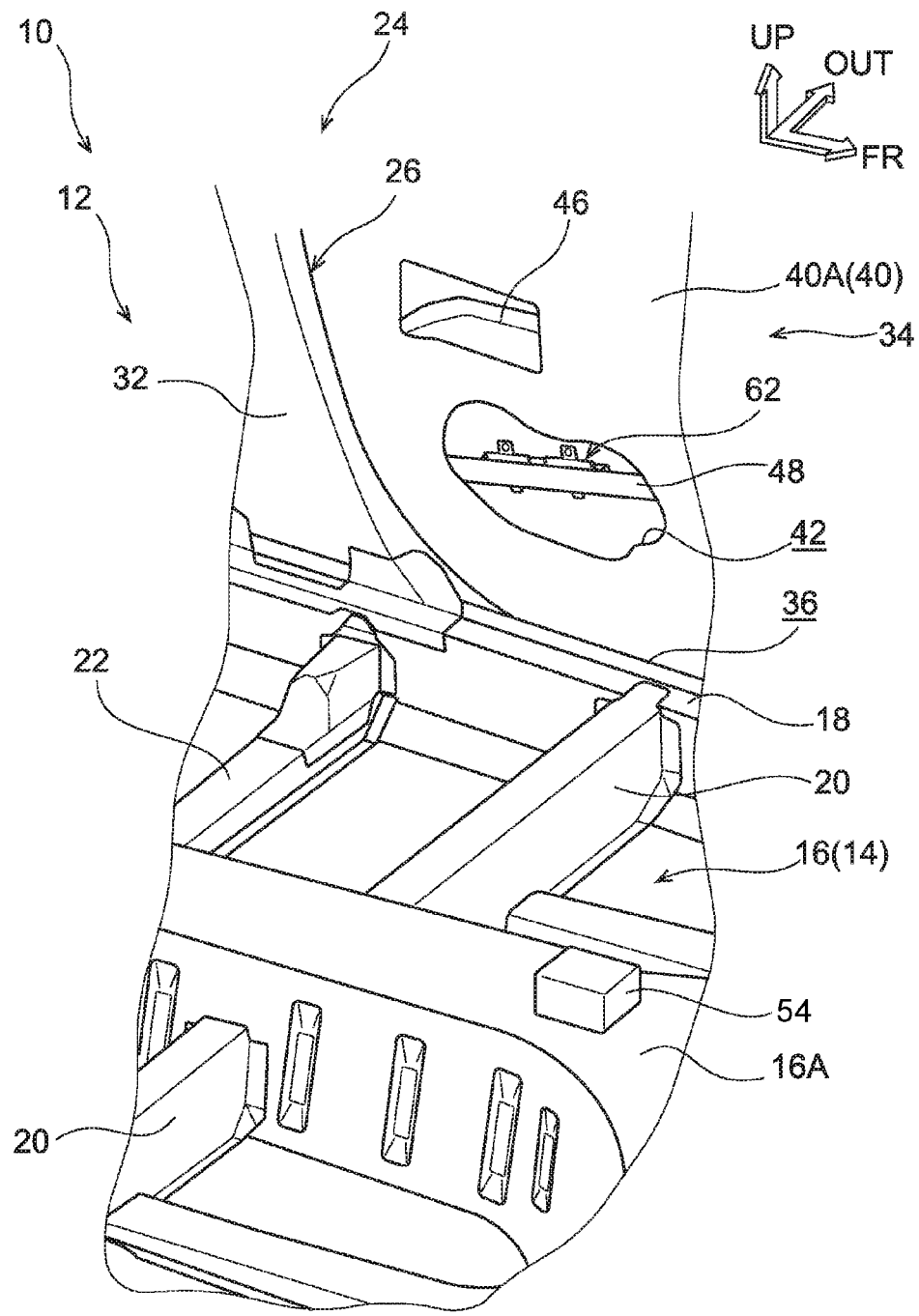
FIG. 10 is a perspective view illustrating a vehicle applied with a vehicle side door structure according to the present exemplary embodiment, as viewed diagonally from the vehicle inner front side.

First, explanation follows regarding configuration of a vehicle body 12 of a vehicle 10 applied with the vehicle side door structure according to the present exemplary embodiment, with reference to FIG. 10. The vehicle body 12 is configured including a floor panel 16 that configures a floor section 14 of the vehicle 10 and extends along the vehicle front-rear direction and vehicle width direction. The floor panel 16 is formed by pressing steel plate. A floor tunnel section 16A that protrudes out toward the vehicle upper side and extends along the vehicle width direction is formed at a vehicle width direction center portion of the floor panel 16.

Rockers 18, each with a closed cross-section profile as viewed from the vehicle front-rear direction, are provided at end portions at both vehicle width direction sides of the floor panel 16. The rockers 18 are coupled to the floor tunnel section 16A by floor cross members 20, 22 extending along the vehicle width direction. End portions at the vehicle width direction outer sides of the floor cross members 22 disposed at a vehicle front-rear direction center portion of the vehicle body 12 are coupled through the rockers 18 to end portions at the vehicle lower side of center pillars 26, each configuring part of a vehicle body side section 24.

Each vehicle body side section 24 is configured including a front pillar, not illustrated in the drawings, and the center pillar 26. The front pillar and the center pillar 26 both extend along the vehicle up-down direction and are disposed in this sequence from the vehicle front side. As is also illustrated in FIGS. 7 and 8, the center pillar 26 is configured including a side member outer panel 28, center pillar outer reinforcement 30, and a center pillar inner panel 32. Note that in the following explanation, the side member outer panel 28 is hereafter simply referred to as side member outer 28. The center pillar outer reinforcement 30 is hereafter simply referred to as outer reinforcement 30. The center pillar inner panel 32 is hereafter simply referred to as pillar inner 32.

Specifically, the pillar inner 32 extends along the vehicle up-down direction, configures a portion at the vehicle width direction inner side of the center pillar 26, and has a hat shaped cross-section open toward the vehicle width direction outer side as viewed in cross-section from the vehicle up-down direction. The outer reinforcement 30 extends along the vehicle front-rear direction, is disposed at the vehicle width direction outer side of the pillar inner 32, and has a hat shaped cross-section open toward the vehicle width direction inner side as viewed in cross-section from the vehicle up-down direction. Respective flange portions of the pillar inner 32 and the outer reinforcement 30 are joined together by a joining means such as welding to configure a closed cross-section structure. The side member outer 28 covers the outer reinforcement 30 from the vehicle width direction outer side, and portions of the side member outer 28 configuring the hat shaped cross-section open toward the vehicle width direction inner side are joined by a joining means such as welding to the flange portions of the outer reinforcement 30. Note that, although not illustrated in its entirety in the drawings, the side member outer 28 configures a large press-molded member with a rocker outer, a roof side rail outer, and so on formed integrally thereto.

A roof side rail, not illustrated in the drawings, is disposed extending along the vehicle front-rear direction at the vehicle upper side of the front pillar and the center pillar 26 configured as described above. The rocker 18 previously described is disposed at the vehicle lower side of the front pillar and the center pillar 26. A door opening section 36 opened and closed by a front side door 34 is formed to a portion at the vehicle front side of the vehicle body side section 24 configured as described above. Namely, the center pillar 26 is disposed so as to partition the door opening section 36. Note that in the below explanation, the front side door 34 is simply referred to as side door 34.

Figure 1:
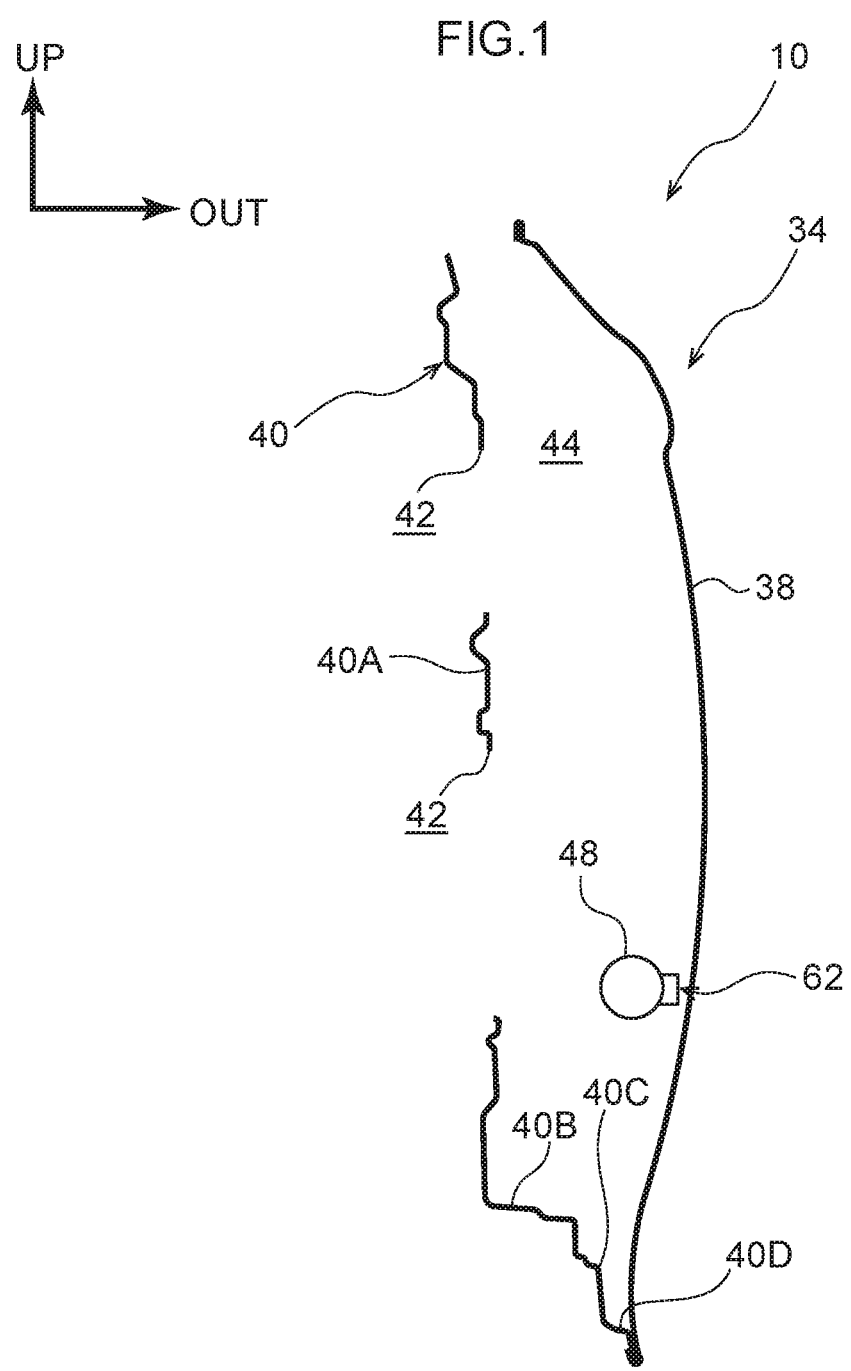
FIG. 1 is a cross-section (a cross-section illustrating a state sectioned along line 1-1 in FIG. 9) of a side door applied with a vehicle side door structure according to an exemplary embodiment, as viewed from the vehicle front side.
Figure 9:
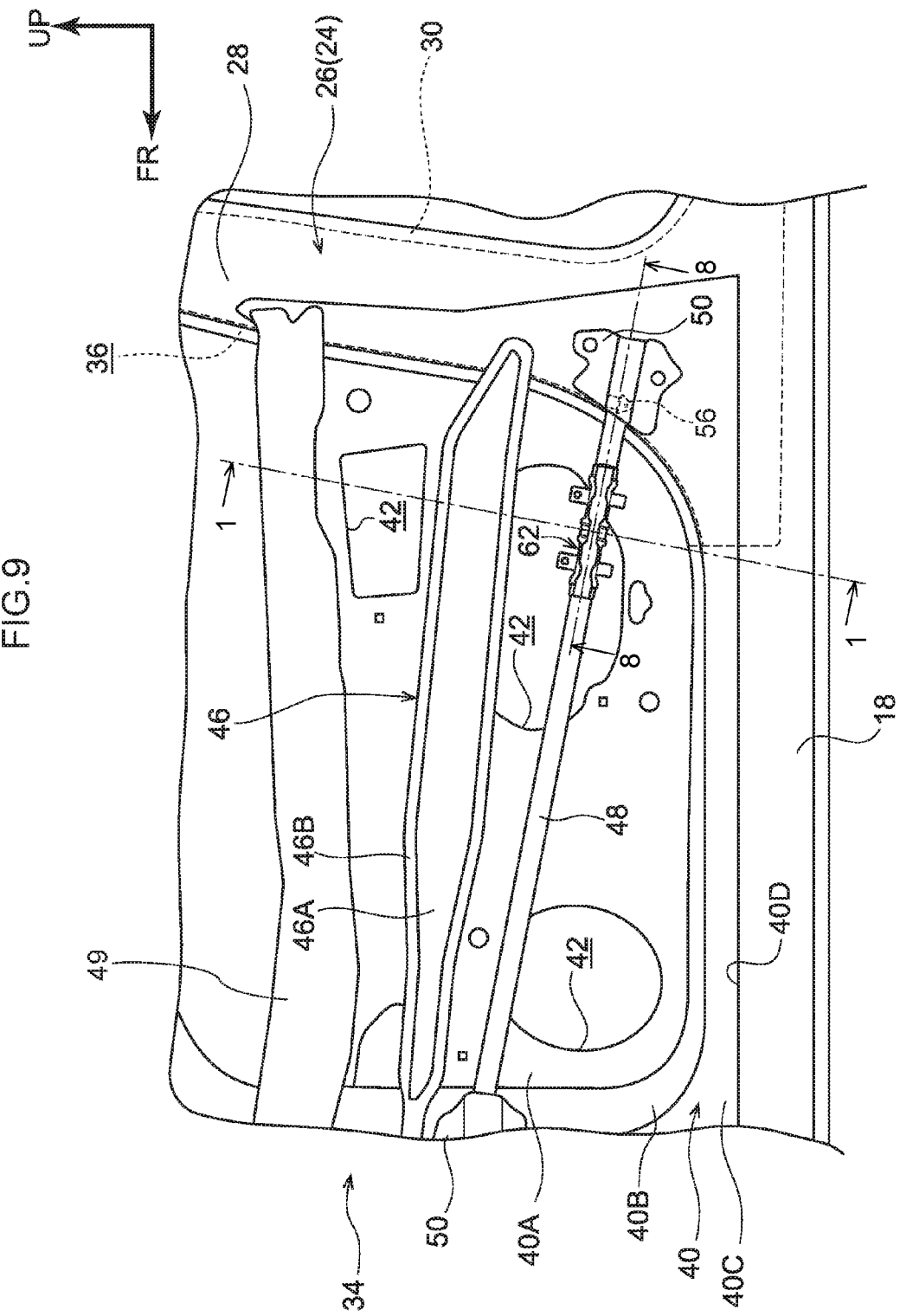
FIG. 9 is a side-on view illustrating a side door applied with the vehicle side door structure according to the present exemplary embodiment in a state in which an outer panel has been removed, as viewed from the vehicle width direction outer side.

As illustrated in FIGS. 1, 8, and 9, in a closed-off state of the door opening section 36 (a closed state of the side door 34), a width direction of the side door 34 (door width direction) is aligned with the vehicle front-rear direction, and a thickness direction of the side door 34 (door thickness direction) is aligned with the vehicle width direction. Note that door width direction and door thickness direction employed in the below explanation both refer to directions of the side door 34 in the closed state.

The side door 34 is configured including an outer panel 38 configuring a portion at the vehicle width direction outer side of the side door 34, and an inner panel 40 configuring a portion at the vehicle width direction inner side of the side door 34. The outer panel 38 extends along the vehicle up-down direction and vehicle front-rear direction, and curves such that a vehicle width direction center portion bulges toward the vehicle width direction outer side as viewed in cross-section from the vehicle up-down direction, and such that a vehicle up-down direction center portion bulges toward the vehicle width direction outer side as viewed in cross-section from the vehicle front-rear direction. In other words, a center portion of the outer panel 38 curves (protrudes) so as to bulge toward the vehicle width direction outer side in a vehicle side-on view (as viewed from the vehicle width direction).

Overall, the inner panel 40 extends along the vehicle up-down direction and vehicle front-rear direction, and is configured including a vertical wall section 40A configuring a main portion of the inner panel 40, a peripheral wall section 40B provided continuously to the vertical wall section 40A, an extension wall section 40C, and a peripheral edge wall section 40D. Specifically, the vertical wall section 40A extends along the vehicle up-down direction and vehicle front-rear direction, is disposed with its plate thickness direction along the vehicle width direction, and is formed with service holes 42, employed during maintenance work and the like, at plural locations. The peripheral wall section 40B runs along a peripheral edge of the vertical wall section 40A, extending out toward the vehicle width direction outer side of the peripheral edge. The extension wall section 40C run along a peripheral edge at the vehicle width direction outer side of the peripheral wall section 40B, extending out from the peripheral edge toward the outer peripheral side of the side door 34. The peripheral edge wall section 40D runs along a peripheral edge of the extension wall section 40C at the opposite side to the peripheral wall section 40B, extending out from the peripheral edge toward the vehicle width direction outer side. A peripheral edge of the peripheral edge wall section 40D is joined to a peripheral edge of the outer panel 38 by hemming.

An internal space 44 is formed with its depth in the vehicle front-rear direction and vehicle width direction between the outer panel 38 and the inner panel 40 configured as described above. Known window regulator and dent reinforcement 46 (see FIG. 7), an impact beam 48, a pressure sensor 53 (main sensor), described later, and the like are disposed in the internal space 44. Although the service holes 42 are formed in the inner panel 40, the service holes 42 are blocked by service hole covers, not illustrated in the drawings, in a state in which the side door 34 has been assembled to the vehicle 10, and so the internal space 44 functions as a pressure chamber. Note that the reference number 49 in FIG. 9 indicates outer reinforcement.

Explanation follows regarding configuration of the dent reinforcement 46 and the impact beam 48, with reference to FIGS. 7 to 9. The dent reinforcement 46 is configured by pressing steel material, and is, as viewed from the vehicle width direction, disposed extending along the vehicle front-rear direction at a vehicle up-down direction center portion of the internal space 44. Specifically, the dent reinforcement 46 is configured including a protruding section 46A that protrudes out toward the vehicle width direction outer side, and a flange section 46B that extends out from a peripheral edge of the protruding section 46A toward the outer peripheral side of the side door 34. Thus, the dent reinforcement 46 is configured in a hat shape open toward the vehicle width direction inner side as viewed in cross-section from the vehicle front-rear direction. Note that both length direction end portions of the dent reinforcement 46 are joined to the extension wall section 40C of the inner panel 40 by a joining means such as welding.

The impact beam 48 is configured in a circular tube shape extending along the vehicle front-rear direction by a straight (uniform cross-section) circular pipe or the like. Extensions 50 are respectively provided at both length direction end portions of the impact beam 48. The extensions 50 are joined to the extension wall section 40C of the inner panel 40, such that both length direction end portions of the impact beam 48 are fixed to the inner panel 40 in a state with the respective extensions 50 interposed therebetween.

As viewed from the vehicle width direction, the impact beam 48 is disposed at the vehicle lower side of the dent reinforcement 46 in a state sloping from the vehicle upper front side toward the vehicle lower rear side. As is also illustrated in FIG. 1, the impact beam 48 is disposed at the outer panel 38 side in the internal space 44.

Explanation follows regarding configuration of an occupant protection device 52 provided to the vehicle 10, with reference to FIGS. 7 to 10. The occupant protection device 52 (see FIG. 8) is configured including the pressure sensor 53 previously described, an airbag electronic control unit (ECU) 54, a first acceleration sensor 56, a second acceleration sensor 58 (a safing sensor, see FIG. 8) built into the airbag ECU 54, and a side collision airbag device 60.

The airbag ECU 54 is disposed at the vehicle front side of an upper face portion of the floor tunnel section 16A of the floor panel 16 (see FIG. 10). As an example, the second acceleration sensor 58 built into the airbag ECU 54 is a three axis acceleration sensor. In the present exemplary embodiment, the above-described pressure sensor 53 is a main detector for detecting a side collision. The first acceleration sensor 56 is attached to a face at the vehicle width direction inner side of the pillar inner 32 of the center pillar 26 (see FIG. 8). The first acceleration sensor 56 is a safing sensor, and is configured so as to be capable of outputting a signal according to acceleration in the vehicle width direction at least. Note that, as viewed from the vehicle width direction, the attachment position of the first acceleration sensor 56 is set in a position overlapping an end portion at the vehicle rear side of the impact beam 48. The side collision airbag device 60 is configured by a side airbag, a curtain airbag, or the like.

The pressure sensor 53, the first acceleration sensor 56, and the second acceleration sensor 58 are electrically connected to the airbag ECU 54, and the airbag ECU 54 outputs an actuation signal to the side collision airbag device 60 according to signals from these sensors.

Figure 2:
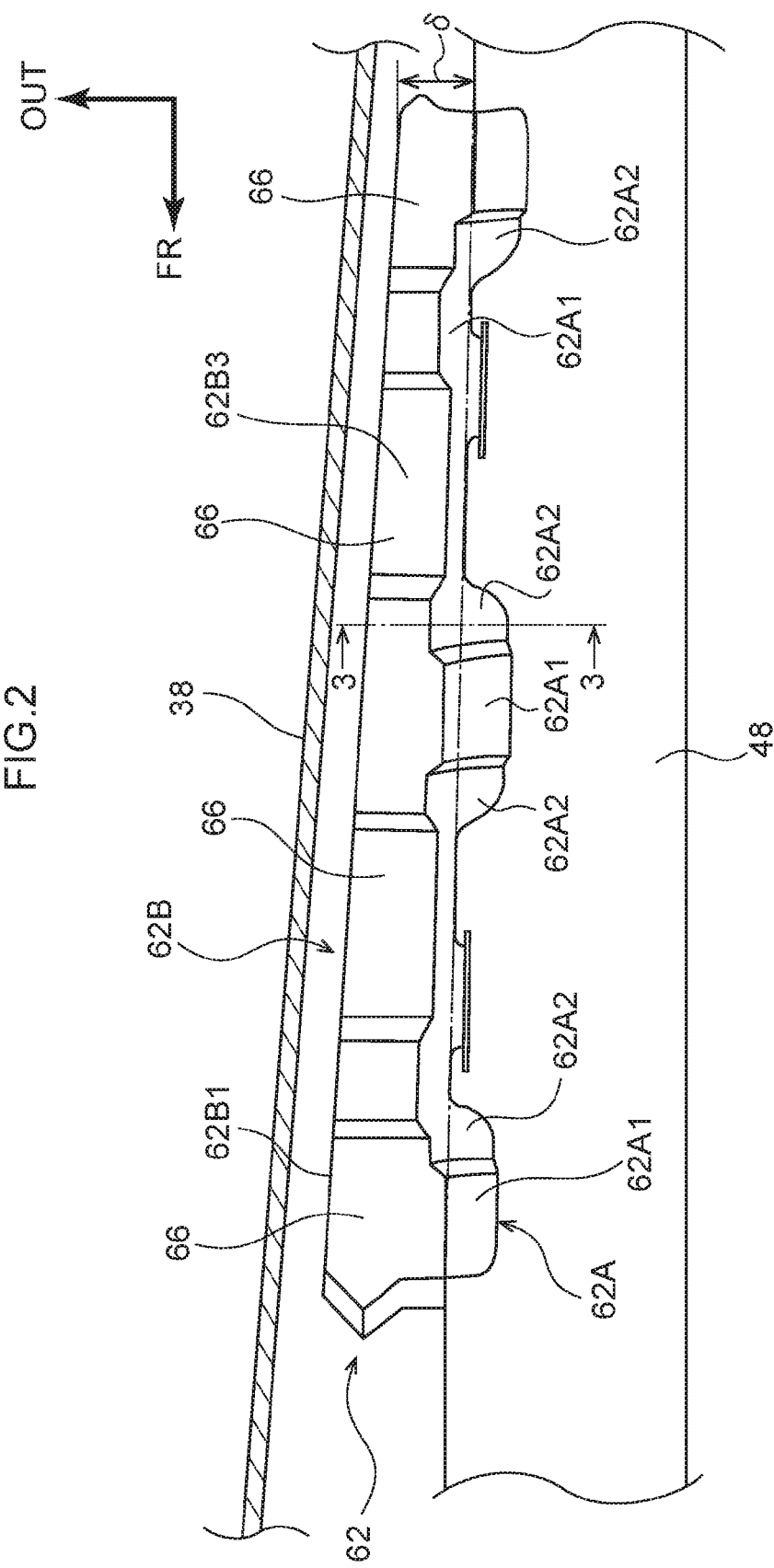
FIG. 2 is an enlarged bottom view illustrating configuration of relevant portions of a side door applied with a vehicle side door structure according to the present exemplary embodiment, as viewed from the vehicle lower side.
Figure 3:
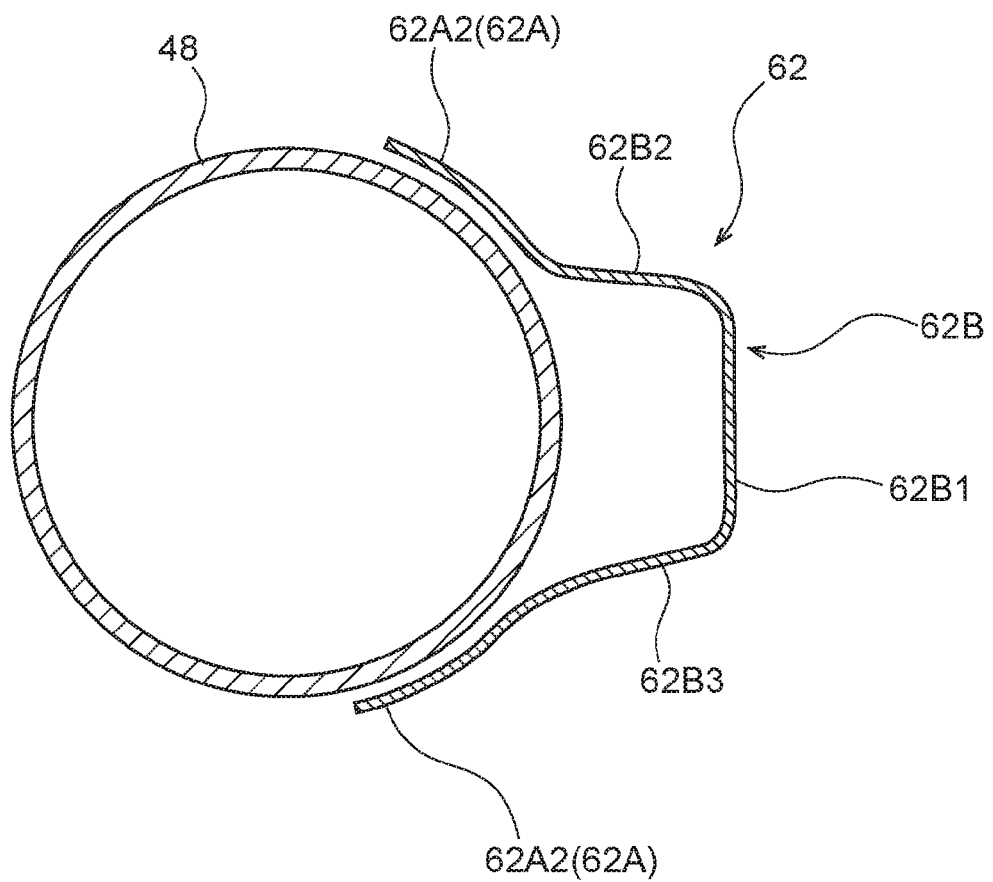
FIG. 3 is an enlarged cross-section (a cross-section illustrating a state sectioned along line 3-3 in FIG. 2) illustrating configuration of relevant portions of a side door applied with a vehicle side door structure according to the present exemplary embodiment, as viewed from the vehicle front side.

Note that in the present exemplary embodiment, as illustrated in FIGS. 1 to 3, a sensing bracket 62 is provided at the impact beam 48, and configuration of the sensing bracket 62 is a feature of the present exemplary embodiment. Detailed explanation follows regarding configuration of the sensing bracket 62, configuring a relevant portion of the present exemplary embodiment.

The sensing bracket 62 is configured including an attachment wall section 62A attached to an outer surface of the impact beam 48, and a jutting out section 62B that juts out from the impact beam 48 toward the outer panel 38. The attachment wall section 62A extends along the length direction of the impact beam 48, and is configured including general portions 62A1 in face-to-face contact with the outer surface of the impact beam 48, and plural protruding portions 62A2 that protrude out further toward the outer peripheral side of the impact beam 48 than the general portions 62A1. Specifically, the protruding portions 62A2 are disposed at four locations, these being locations separated by a specific distance from both length direction end portions of the attachment wall section 62A toward the length direction center side of the attachment wall section 62A, and locations separated by a specific distance from a length direction center portion of the attachment wall section 62A toward the length direction end portion sides of the attachment wall section 62A. The general portions 62A1 of the attachment wall section 62A are attached to the outer surface of the impact beam 48 by a joining means such as welding, such that the attachment wall section 62A is in a state in which intermittent weld portions are formed thereon.

The jutting out section 62B is configured including a side wall portion 62B1, and an upper wall portion 62B2 and a lower wall portion 62B3 that are provided continuously to the side wall portion 62B1. Specifically, the side wall portion 62B1 faces the outer panel 38, extends along the length direction of the impact beam 48, and is configured in a rectangular plate shape with its plate thickness direction along the vehicle width direction. As viewed from the vehicle up-down direction, the side wall portion 62B 1 slopes from the vehicle outer front side toward the vehicle inner rear side, and a jutting out amount δ of the jutting out section 62B from the impact beam 48 toward the outer panel 38 increases on progression toward a vehicle front-rear direction center portion of the outer panel 38. The upper wall portion 62B2 extends out from a peripheral edge at the vehicle upper side (upper edge) of the side wall portion 62B 1 toward the vehicle width direction inner side, and is configured in a plate shape with its plate thickness direction along the vehicle up-down direction. The lower wall portion 62B3 extends out from a peripheral edge at the vehicle lower side (lower edge) of the side wall portion 62B 1 toward the vehicle width direction inner side, and is configured in a plate shape with its plate thickness direction along the vehicle up-down direction. Namely, in cross-section viewed from the vehicle front-rear direction, the jutting out section 62B is configured in a U shape open toward the vehicle width direction inner side, and extends along the length direction of the impact beam 48.

As is also illustrated in FIG. 7, upper side bead portions 64 are provided to the upper wall portion 62B2, and lower side bead portions 66 are provided to the lower wall portion 62B3. Note that as viewed from the vehicle width direction, the upper side bead portions 64 and the lower side bead portions 66 are configured with symmetry about a length direction center line of the jutting out section 62B, and so explanation only follows regarding configuration of the upper side bead portions 64.

The upper side bead portions 64 protrude out from the upper wall portion 62B2 toward the vehicle upper side, and are formed at plural locations along the length direction of the jutting out section 62B. Specifically, the upper side bead portions 64 are disposed at four locations, these being locations at both length direction end portions of the upper wall portion 62B2, and locations separated by a specific distance from a length direction center portion of the upper wall portion 62B2 toward the length direction end portion sides of the upper wall portion 62B2. As viewed from the vehicle width direction, each upper side bead portion 64 widens toward a center portion in the short direction of the jutting out section 62B, and forms a trapezoidal shape along the upper edge of the side wall portion 62B 1. Configuration of the four upper side bead portions 64 is symmetrical about a center line in the short direction of the jutting out section 62B.

The sensing bracket 62 configured as described above is attached in the vicinity of the end portion at the vehicle rear side of the impact beam 48, and is, as viewed from the vehicle width direction, disposed further toward the vehicle rear side and vehicle lower side than the center portion of the outer panel 38.

Operation and Advantageous Effects of Present Exemplary Embodiment

Explanation follows regarding operation and advantageous effects of the present exemplary embodiment.

First, a control flow of the side collision airbag device 60 is explained in outline, with reference to FIG. 4. FIG. 4 illustrates an example of a control flow by the airbag ECU 54. When the control flow starts, at step S1, determination is made as to whether or not a detection value of the pressure sensor 53 (pressure in the internal space 44) is a threshold value or greater. In cases in which the detection value is determined to be smaller than the threshold value, processing proceeds to step S5, and the side collision airbag device 60 is not actuated (non-actuation). In cases in which the detection value is determined to be the threshold value or greater, processing proceeds to step S2 and step S3.

At step S2, determination is made as to whether or not a detection value of the first acceleration sensor 56 (acceleration of the center pillar 26) is a threshold value or greater. In cases in which the detection value is determined to be smaller than the threshold value, processing proceeds to step S5, and the side collision airbag device 60 is not actuated. In cases in which the detection value is determined to be the threshold value or greater, processing proceeds to step S4, and the side collision airbag device 60 is actuated.

At step S3, determination is made as to whether or not a detection value of the second acceleration sensor 58 (acceleration of the floor panel 16) is a threshold value or greater. In cases in which the detection value is determined to be smaller than the threshold value, processing proceeds to step S5, and the side collision airbag device 60 is not actuated. In cases in which the detection value is determined to be the threshold value or greater, processing proceeds to step S4, and the side collision airbag device 60 is actuated.

Namely, the airbag ECU 54 actuates the side collision airbag device 60 at the point in time at which both the detection value of the pressure sensor 53 is the threshold value or greater, and the detection value of either the first acceleration sensor 56 or the second acceleration sensor 58 is the threshold value or greater. The control flow is ended after the side collision airbag device 60 has been actuated.

Explanation follows regarding load transmission during a side-on collision in cases in which the vehicle side door structure according to the present exemplary embodiment is applied. In the present exemplary embodiment, as illustrated in FIG. 1, the portion at the vehicle width direction outer side of the side door 34 is configured by the outer panel 38 extending along the vehicle up-down direction and vehicle front-rear direction. The portion at the vehicle width direction inner side of the side door 34 is configured by the inner panel 40 extending along the vehicle up-down direction and vehicle front-rear direction. The internal space 44 is formed by the outer panel 38 and the inner panel 40, and the impact beam 48 is disposed at the outer panel 38 side in the internal space 44. The impact beam 48 is configured in a straight tube shape extending along the vehicle front-rear direction, with both length direction end portions fixed to the inner panel 40. Thus, when localized collision load is input to the outer panel 38 of the side door 34, the outer panel 38 is pressed and deformed, and collision load is input to the impact beam 48 through the outer panel 38. Collision load that has been input to the impact beam 48 is transmitted to the inner panel 40 from both length direction end portions of the impact beam 48.

When there is a gap between the outer panel 38 and the impact beam 48, a time lag arises between the start of deformation of the outer panel 38 and the start of deformation of the impact beam 48, and it is conceivable that there is a delay in transmission of collision load to the inner panel 40. In cases in which the first acceleration sensor 56 or the second acceleration sensor 58 that detect side-on collisions are disposed on the inner panel 40, or on a configuration member of the vehicle body 12 to which load is transmitted from the inner panel 40, collision load is preferably transmitted to the inner panel 40 at an earlier stage.

Note that in the present exemplary embodiment, the impact beam 48 is provided with the sensing bracket 62 that juts out from the impact beam 48 toward the outer panel 38. Thus, when localized collision load is input to the outer panel 38, collision load can be transmitted from the outer panel 38 to the impact beam 48 at an early stage, in a state in which the deformation amount of the outer panel 38 is smaller by the amount at which the sensing bracket 62 juts out. This enables the time taken to transmit load from the outer panel 38 to the inner panel 40 to be shorter than in cases in which the sensing bracket 62 is not provided to the impact beam 48. Thus, the present exemplary embodiment enables collision load to be transmitted to the first acceleration sensor 56 (and to the second acceleration sensor 58) at an earlier stage when localized collision load is input to the side door 34.

In the present exemplary embodiment, the sensing bracket 62 is disposed further toward the vehicle rear side than the vehicle front-rear direction center portion of the outer panel 38 in a vehicle side-on view. Thus, in cases in which localized collision load has been input further toward the vehicle rear side than the vehicle front-rear direction center portion of the outer panel 38 in a vehicle side-on view, collision load can be transmitted from the outer panel 38 to the impact beam 48 in a state in which the deformation amount of a portion at the vehicle rear side of the outer panel 38 is small.

In cases in which an occupant has a small build, a distance between the outer panel 38 of the side door 34 and the occupant is secured, and it is relatively easy to secure enough usable time to deploy a side collision airbag. However, in cases in which the occupant has a large build, it is difficult to secure a distance between the outer panel 38 of the side door 34 and the occupant, and it is conceivably difficult to secure enough usable time to deploy the side collision airbag. The seated position of occupants with a large build is often positioned further toward the vehicle rear side than the seated position of occupants with a small build.

Note that in the present exemplary embodiment as described above, in cases in which localized collision load has been input further toward the vehicle rear side than the vehicle front-rear direction center portion of the outer panel 38 in a vehicle side-on view, collision load is more readily transmitted from the outer panel 38 to the impact beam 48. Thus, enough usable time to deploy the side collision airbag can be secured, even in cases in which an occupant with a large build is onboard the vehicle.

In the present exemplary embodiment, the first acceleration sensor 56 is disposed on the center pillar 26, and the first acceleration sensor 56 detects collision load transmitted from the sensing bracket 62 to the center pillar 26 through the inner panel 40. Regarding the deformation amount of the center pillar 26 in the vehicle width direction in cases in which collision load has been input to the center pillar 26, a portion at the vehicle upper side of the center pillar 26 is more readily influenced by the collision load, while a base portion of the center pillar 26 is less readily influenced by the collision load. Namely, in the present exemplary embodiment, providing the sensing bracket 62 at a position at the vehicle lower side of the center pillar 26 as described above enables the transmission efficiency of collision load from the outer panel 38 of the side door 34 to the first acceleration sensor 56 disposed on the center pillar 26 to be secured. Thus, the present exemplary embodiment enables the side collision airbag to be stably deployed, regardless of whether the occupant has a small build or a large build, and enables collision load to be transmitted at an early stage to the first acceleration sensor 56 disposed on the center pillar 26.

In the present exemplary embodiment, the vehicle front-rear direction center portion of the outer panel 38 of the side door 34 curves so as to bulge toward the vehicle width direction outer side, and the outer panel 38 forms a curved styling face of the side door 34. The jutting out amount δ of the sensing bracket 62 from the impact beam 48 toward the outer panel 38 increases on progression toward the vehicle front-rear direction center portion of the outer panel 38. This enables the jutting out amount δ of the sensing bracket 62 to be made to correspond to the shape of the outer panel 38. Thus, the present exemplary embodiment enables both collision load to be transmitted at an earlier stage to the first acceleration sensor 56 (and to the second acceleration sensor 58), and the styling of the side door 34 to be secured.

In the present exemplary embodiment, the sensing bracket 62 includes the side wall portion 62B1, the upper wall portion 62B2, and the lower wall portion 62B3, is configured in a U shape open toward the vehicle width direction inner side in cross-section viewed from the vehicle front-rear direction, and extends along the length direction of the impact beam 48. This enables the rigidity of the sensing bracket 62 with respect to collision load input to the side door 34 to be secured.

Note that in the present exemplary embodiment, the upper wall portion 62B2 of the sensing bracket 62 is formed with the upper side bead portions 64 that protrude out toward the vehicle upper side and run along the upper edge of the side wall portion 62B1. The lower wall portion 62B3 of the sensing bracket 62 is formed with the lower side bead portions 66 that protrude out toward the vehicle lower side and run along the lower edge of the side wall portion 62B 1. Thus, the sensing bracket 62 is reinforced by the upper side bead portions 64 and the lower side bead portions 66. This enables cross-sectional collapse of the sensing bracket 62 (in cross-section viewed from the vehicle front-rear direction) when the sensing bracket 62 has borne collision load to be suppressed.

Figure 5A:
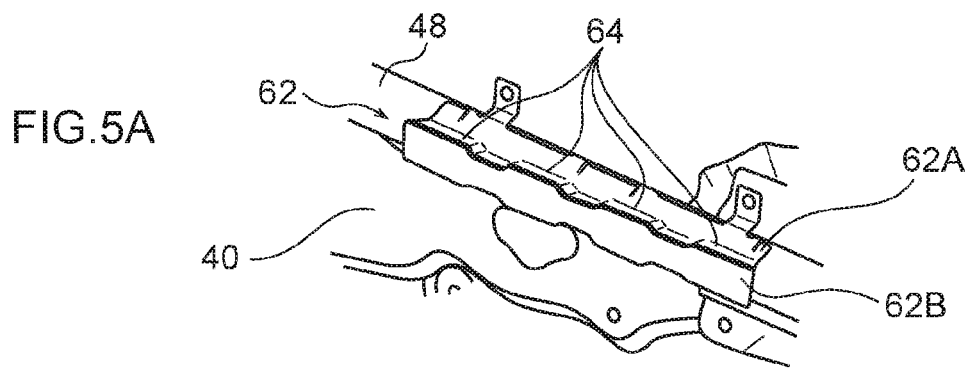
FIG. 5A is a perspective view illustrating a deformed state of a sensing bracket and an impact beam directly after localized collision load has been input to a side door applied with a vehicle side door structure according to the present exemplary embodiment, as viewed diagonally from the vehicle outer rear side.
Figure 5B:
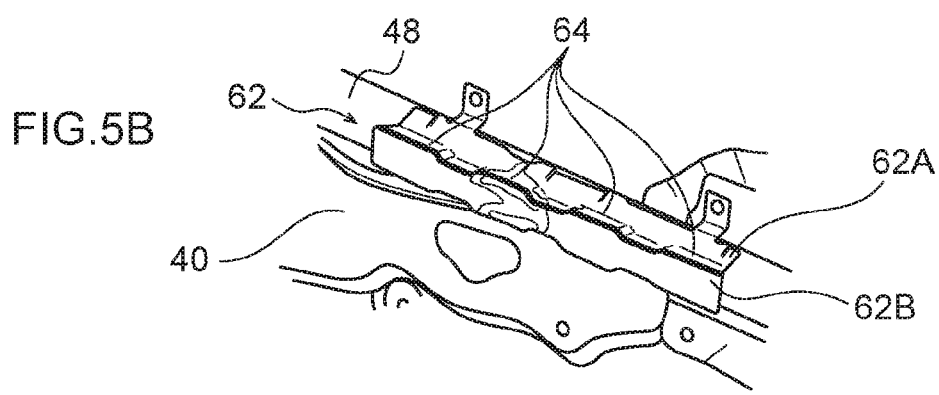
FIG. 5B is a perspective view illustrating the next state of the sensing bracket and the impact beam after FIG. 5A, when localized collision load has been input to the side door applied with the vehicle side door structure according to the present exemplary embodiment, as viewed diagonally from the vehicle outer rear side.
Figure 5C:
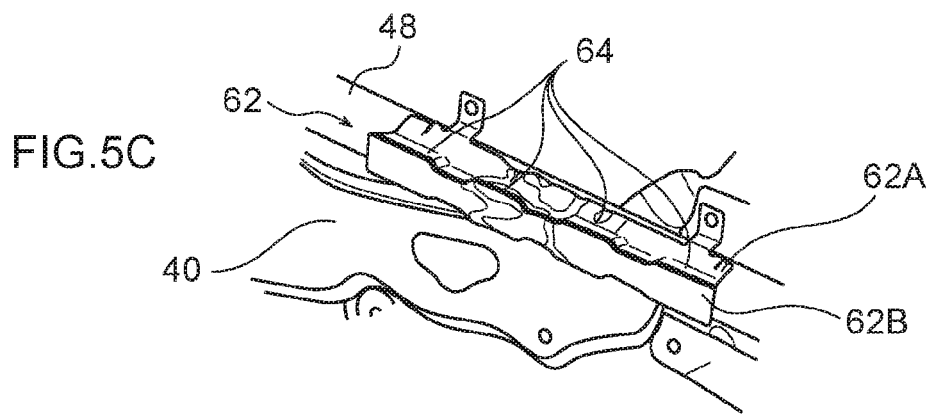
FIG. 5C is a perspective view illustrating the next state of the sensing bracket and the impact beam after FIG. 5B, when localized collision load has been input to the side door applied with the vehicle side door structure according to the present exemplary embodiment, as viewed diagonally from the vehicle outer rear side.
Figure 5D:
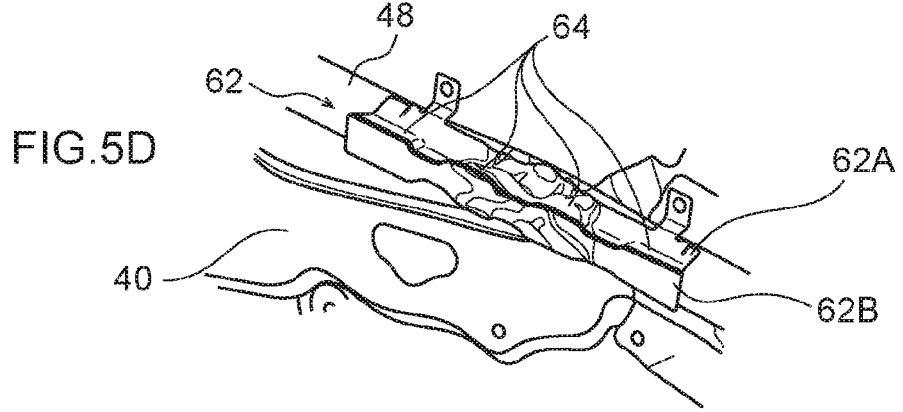
FIG. 5D is a perspective view illustrating the next state of the sensing bracket and the impact beam after FIG. 5C, when localized collision load has been input to the side door applied with the vehicle side door structure according to the present exemplary embodiment, as viewed diagonally from the vehicle outer rear side.

Specific explanation follows regarding behavior of the sensing bracket 62 when localized collision load has been input to the side door 34, with reference to FIGS. 5A to 6D. Note that FIGS. 5A, 5B, 5C, and 5D correspond in sequence to the states in FIGS. 6A, 6B, 6C, and 6D. As illustrated in FIGS. 5A and 6A, when localized collision load is input to the side door 34 by a colliding body 68, first, the outer panel 38 is pressed and deformed by the colliding body 68. Then, as illustrated in FIGS. 5B and 6B, collision load is input from the colliding body 68 to the sensing bracket 62 through the outer panel 38. When this occurs, as illustrated in FIGS. 5C and 6C, the sensing bracket 62 is pressed by the colliding body 68, and the sensing bracket 62 is deformed such that a spacing between the upper wall portion 62B2 and the lower wall portion 62B3 widens and is also deformed such that the side wall portion 62B 1 flexes toward the vehicle width direction inner side. However, a placement state of the upper wall portion 62B2 and the lower wall portion 62B3 is maintained in a parallel state, this being the state prior to the collision. As illustrated in FIGS. 5D and 6D, the entire sensing bracket 62 undergoes flexing deformation so as to bulge toward the vehicle width direction inner side together with the impact beam 48 when collision load is input. Thus, the present exemplary embodiment enables the transmission efficiency of load from the outer panel 38 to the impact beam 48 to be improved.

Supplementary Explanation of Above Exemplary Embodiment (1) The exemplary embodiment described above is configured such that the main sensor is the pressure sensor 53, and the first acceleration sensor 56 and the second acceleration sensor 58 are safing sensors; however there is no limitation thereto. For example, a configuration may be applied in which the first acceleration sensor 56 is a main sensor, and the second acceleration sensor 58 is a safing sensor, without providing the pressure sensor 53. Alternatively, a configuration may be applied in which the first acceleration sensor 56 is disposed at the inner panel 40 of the side door 34 as a main sensor instead of the pressure sensor 53, and the second acceleration sensor 58 is disposed at the pillar inner 32 of the center pillar 26 as a safing sensor. Alternatively, a configuration may be applied in which the pressure sensor 53 is a main sensor, and either the first acceleration sensor 56 of the second acceleration sensor 58 is a safing sensor. A configuration may be applied in which the side collision airbag device 60 is actuated in cases in which both the detection value of the first acceleration sensor 56 and the detection value of the second acceleration sensor 58 are threshold values or greater, without disposing the pressure sensor 53. Note that the first acceleration sensor 56 and the second acceleration sensor 58 are not limited to the sensors described above, and various detection methods may be adopted.

(2) In the exemplary embodiment described above, an example has been given of a case in which the vehicle side door structure according to the present exemplary embodiment has been applied to the side door 34 on the vehicle width direction left side; however, the vehicle side door structure according to the present exemplary embodiment may also be applied to a side door on the vehicle width direction right side.

(3) In the exemplary embodiment described above, the cross-section profile of the jutting out section 62B of the sensing bracket 62 has a U shape open toward the vehicle width direction inner side; however, various cross-section profiles, such as a circular arc shape or a V shape, may be applied. In cases in which sufficient rigidity can be secured by the jutting out section 62B alone, a configuration may be applied in which the upper side bead portions 64 and the lower side bead portions 66 are not provided. Note that the placement position of the sensing bracket 62 is not limited to the position described above, and may be changed as appropriate according to the vehicle type and so on.

(4) In the exemplary embodiment described above, the impact beam 48 is configured in a circular tube shape; however, the impact beam 48 may be configured as an angular pipe or the like.

(5) In the exemplary embodiment described above, the first acceleration sensor 56 is attached to the pillar inner 32 of the center pillar 26, and in cases in which the first acceleration sensor 56 and the center pillar 26 are incorporated as part of the present disclosure, the present disclosure may be understood to be a vehicle body side section structure. Similarly, in cases in which the second acceleration sensor 58 and the floor panel 16 are incorporated as parts of the present aspect, the present disclosure may be understood to be a vehicle body structure.

What is claimed is:

1. A vehicle side door structure comprising:
   an outer panel that configures a portion at a vehicle width direction outer side of a side door and that extends along a vehicle up-down direction and a vehicle front-rear direction;
   an inner panel that configures a portion at a vehicle width direction inner side of the side door, that extends along the vehicle up-down direction and the vehicle front-rear direction, and that, together with the outer panel, forms an internal space;
   an impact beam having both length direction end portions fixed to the inner panel, that is configured in a straight tube shape extending along the vehicle front-rear direction, and that is disposed at an outer panel side in the internal space; and
   a sensing bracket that is provided at the impact beam and that juts out from the impact beam toward the outer panel.

2. The vehicle side door structure of claim 1, wherein the sensing bracket is disposed, in a vehicle side-on view, further toward a vehicle rear side and a vehicle lower side than a center portion of the outer panel.

3. The vehicle side door structure of claim 1, wherein:
   a vehicle front-rear direction center portion of the outer panel curves so as to bulge toward the vehicle width direction outer side; and
   a jutting out amount of the sensing bracket from the impact beam toward the outer panel increases on progression toward the vehicle front-rear direction center portion of the outer panel.

4. The vehicle side door structure of claim 2, wherein:
   a vehicle front-rear direction center portion of the outer panel curves so as to bulge toward the vehicle width direction outer side; and
   a jutting out amount of the sensing bracket from the impact beam toward the outer panel increases on progression toward the vehicle front-rear direction center portion of the outer panel.

5. The vehicle side door structure of claim 1, wherein:
   the sensing bracket includes:
   a side wall portion that faces the outer panel and extends along the length direction of the impact beam,
   an upper wall portion that extends out from a peripheral edge at a vehicle upper side of the side wall portion toward the vehicle width direction inner side, and
   a lower wall portion that extends out from a peripheral edge at a vehicle lower side of the side wall portion toward the vehicle width direction inner side; and
   an upper side bead portion is formed at the upper wall portion so as to protrude out toward the vehicle upper side and run along an upper edge of the side wall portion, and a lower side bead portion is formed at the lower wall portion so as to protrude out toward the vehicle lower side and run along a lower edge of the side wall portion.

* * * * *